No. 847,900. PATENTED MAR. 19, 1907.
W. H. BUSSELL.
WHEEL RUNNER FOR BABY CARRIAGES.
APPLICATION FILED OCT. 13, 1906.
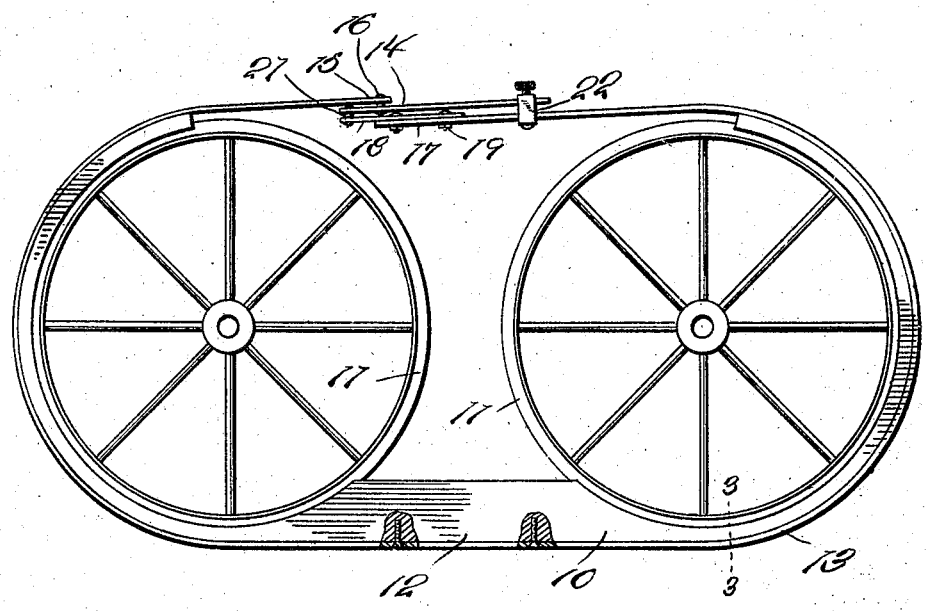
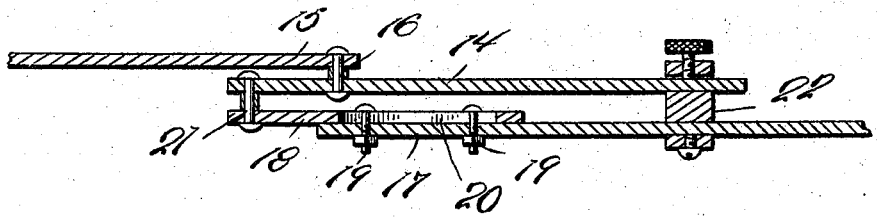
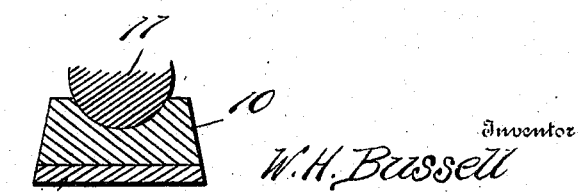
Witnesses
G. R. Thomas
J. W. Quinn
Inventor
W. H. Bussell
By Chandlee & Chandlee
Attorneys

UNITED STATES PATENT OFFICE.

WILLIAM H. BUSSELL, OF NECEDAH, WISCONSIN.

WHEEL-RUNNER FOR BABY-CARRIAGES.

No. 847,900.     Specification of Letters Patent.     Patented March 19, 1907.

Application filed October 13, 1906. Serial No. 338,751.

*To all whom it may concern:*

Be it known that I, WILLIAM H. BUSSELL, a subject of the King of England, residing at Necedah, in the county of Juneau, State of Wisconsin, have invented certain new and useful Improvements in Wheel-Runners for Baby-Carriages; and I do hereby declare the following to be a full, clear, and exact description of the invention, such as will enable others skilled in the art to which it appertains to make and use the same.

This invention has relation to runners for attachment to the wheels of vehicles to enable them to slide over snow and ice similar to sleds and sleighs, and it is particularly adapted for use on baby-carriages.

It is the object of the invention to provide a runner that is simple in construction, in order that persons of little knowledge of the use of machines or mechanical devices may readily come to understand how to apply and use it, and that shall be efficient in use to render it capable of drawing the carriage from place to place over surfaces of varying condition.

There are also other objects and purposes in devising the improvements that will appear obvious in the description of the construction and mode of operation of the invention.

The nature of the invention has been set forth to such an extent in the foregoing statements as not to need further description at this point or time.

The annexed drawings form a part of this specification and are to be referred to as such.

Figure 1 is a side view of my invention, showing it as applied to two wheels of a baby-carriage. Fig. 2 is a longitudinal section through the adjusting portion of the structure. Fig. 3 is a section on the line 3 3 of Fig. 1.

Similar figures of reference designate similar parts or features, as the case may be, wherever they occur.

I will first proceed to describe the invention in detail, in view of the aforesaid drawings, and to point out with particularity the parts or improvements constituting the invention in the subjoined claims.

In the drawings, 10 designates what I have chosen to term the "frame," which part is made of wood and passes from near the top of each of the wheels 11 around their outer sides and beneath and between the bottoms of the same. The portion 12 between the wheels at the bottom is of considerably greater height than elsewhere in order to prevent the wheels from coming together when the runner 13 is clamped thereon. The frame is grooved on the inside to fit the periphery of the vehicle-wheel 11 and is deep enough to protect the sides of the vehicle-tires and to hold the frame thereon. The sole 13 of the runner consists of a strip of steel or iron of suitable thickness and passes entirely around a pair of wheels 11 outside of the wood frame 10 and is connected with the latter by rivets or screws, as may be considered best.

14 designates a lever for clamping the sole of the runner on the wheels. The said lever is pivoted to one of the meeting ends 15 of the sole, as indicated at 16. In order to render the connection of the meeting ends of the sole adjustable, so that the runner may fit pairs of wheels of different size, and instead of pivoting the other meeting end 17 directly to the lever, I interpose an adjusting-plate 18 between the said end 17 and the lever and connect the plate with the said end portion by means of bolts and nuts 19, the former extending through a slot 20, formed in the plate, so as to practically lengthen or shorten the meeting end and pivot the lever 14 to the said plate, as indicated at 21.

22 is a knob on the outer end of the lever, said knob having a downward extension adapted to act as a catch in engaging the side of the sole and in this way prevents the lever from "opening" accidentally when the device is in use. The knob may be fastened to the lever by a bolt and nut or any other known and suitable means.

The runners are attached to the vehicle-wheels by first opening the lever to expand their diameter, then setting the wheels in the grooves made for them in the frame and closing the lever to tighten the runner thereon. It is obvious that by a reverse operation from that just described the runners may be detached from the vehicle.

While the description has in the main been directed to runners for baby-carriages, it is obvious that they may, as a whole or in part, be applied to wheels of other vehicles.

What is claimed as the invention is—

1. A runner for vehicle-wheels, comprising a frame of wood, grooved to receive the tires of a pair of wheels, and extending from their tops about their outer sides and beneath and between their bottoms, and a strip of steel, forming the sole, extending around the frame and across from the top of one wheel to the other.

2. A runner for vehicle-wheels, comprising a frame of wood, grooved to receive the tires of a pair of wheels, and extending from their tops about their outer sides and beneath and between their bottoms, and a strip of steel, forming the sole, extending around the frame and across from the top of one wheel to the other, combined with means connected with the sole, at the top between the wheels, for opening and closing the runners to put them on and remove them from the vehicle-wheels.

3. A runner for vehicle-wheels comprising a frame of wood, grooved to receive the tires of a pair of wheels, and extending from their tops about their outer sides and beneath and between their bottom, and a strip of steel, forming the sole, adjustably connected at its ends extending about the frame and in connection therewith and inclosing the wheels.

In testimony whereof I affix my signature in presence of two witnesses.

WILLIAM H. BUSSELL.

Witnesses:
FRANK SPENCER,
MAYME E. WALSH.